March 9, 1965 J. RABINOW ETAL 3,172,496
VEHICLE GUIDANCE BY OPTICAL MEANS
Filed Jan. 15, 1962 4 Sheets-Sheet 1

INVENTORS
Jacob Rabinow
William Fischer
BY Joseph A. Genovese &
Max L. Libman
ATTORNEYS March 9, 1965 J. RABINOW ETAL 3,172,496
VEHICLE GUIDANCE BY OPTICAL MEANS
Filed Jan. 15, 1962 4 Sheets-Sheet 2
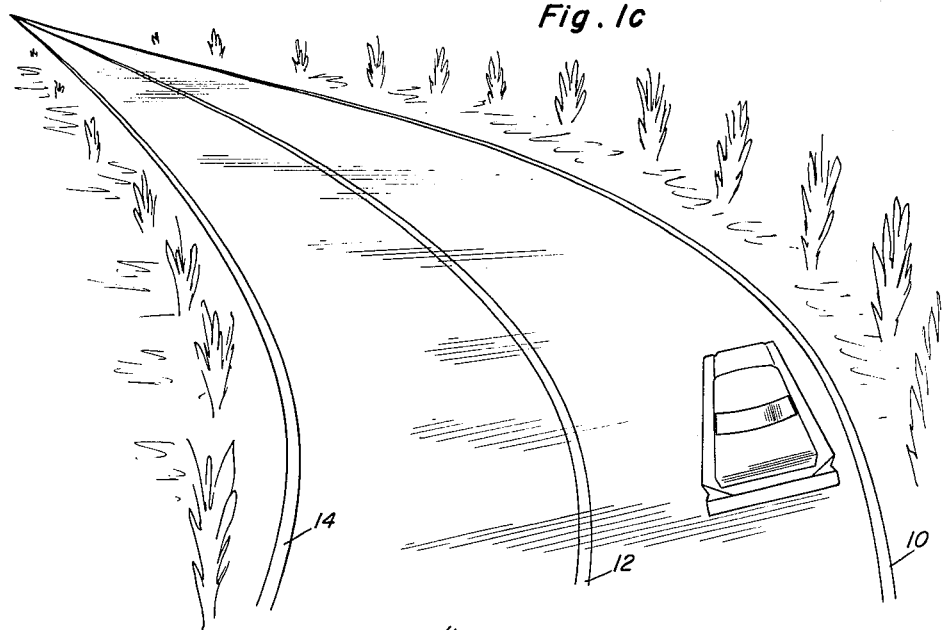
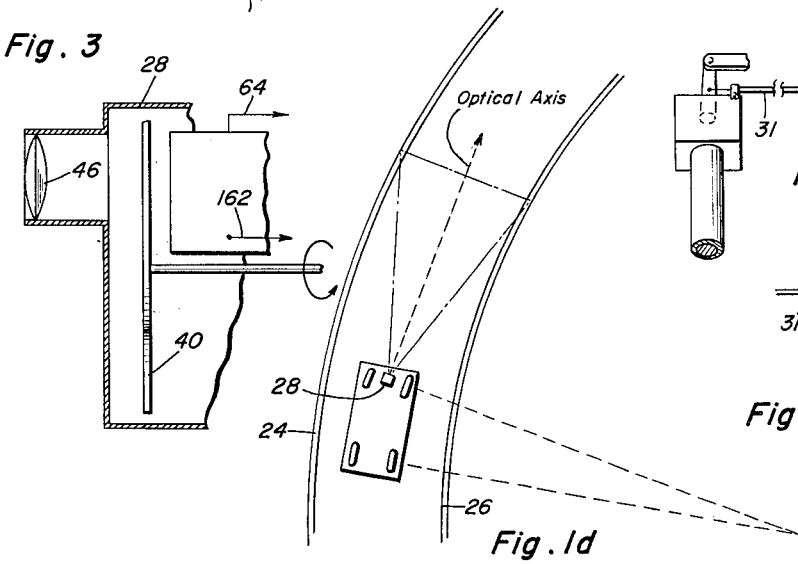
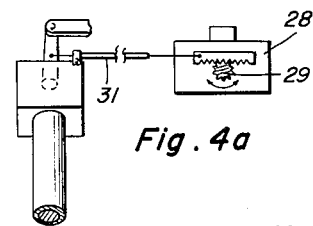
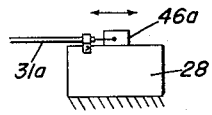
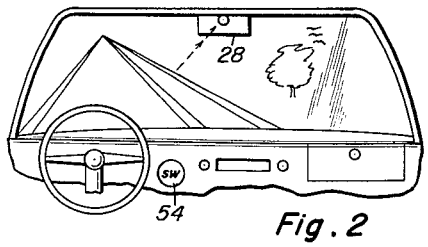
INVENTOR
Jacob Rabinow
William Fischer
BY Joseph A. Genovese &
Max L. Libman
ATTORNEYS

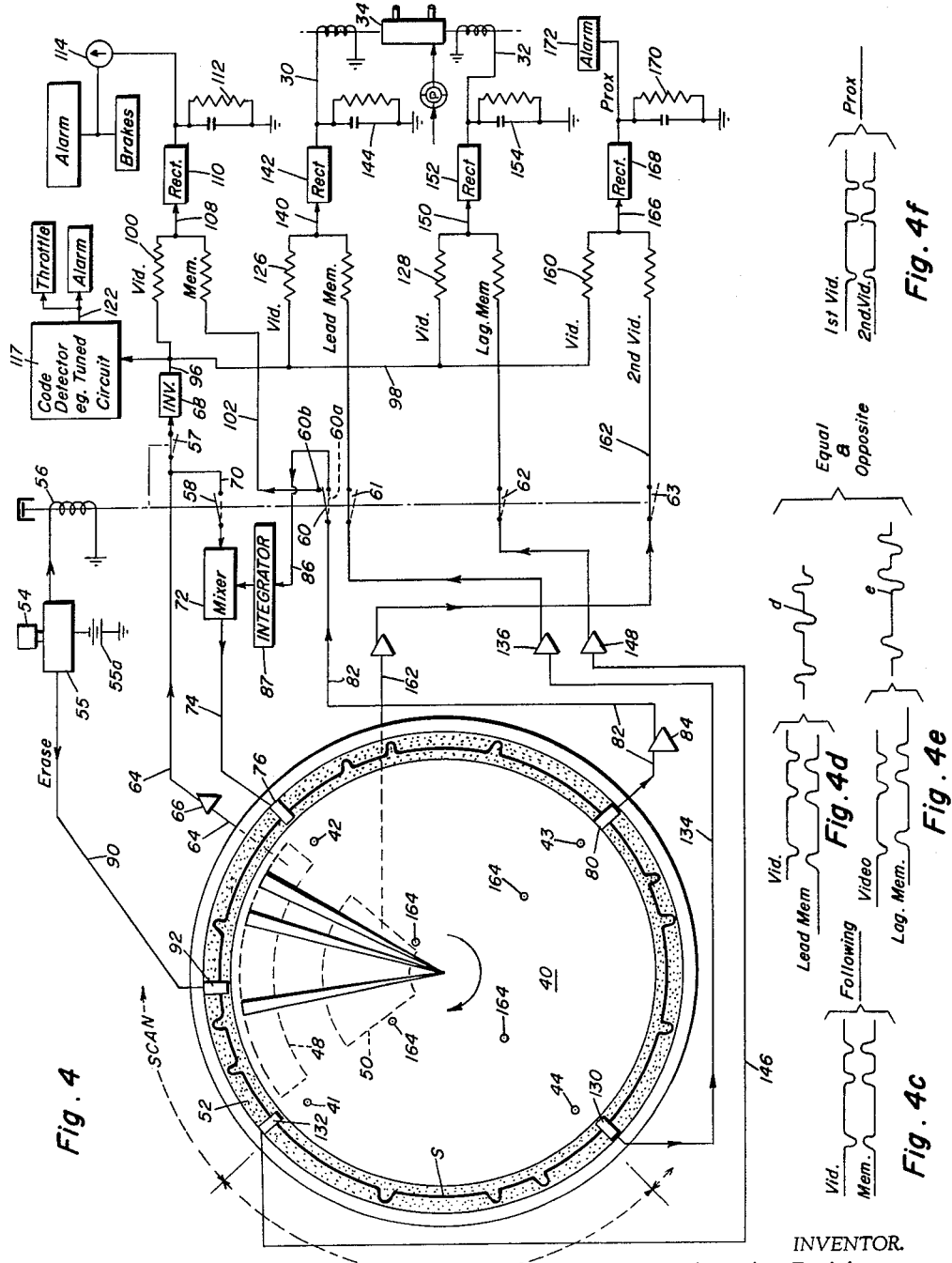

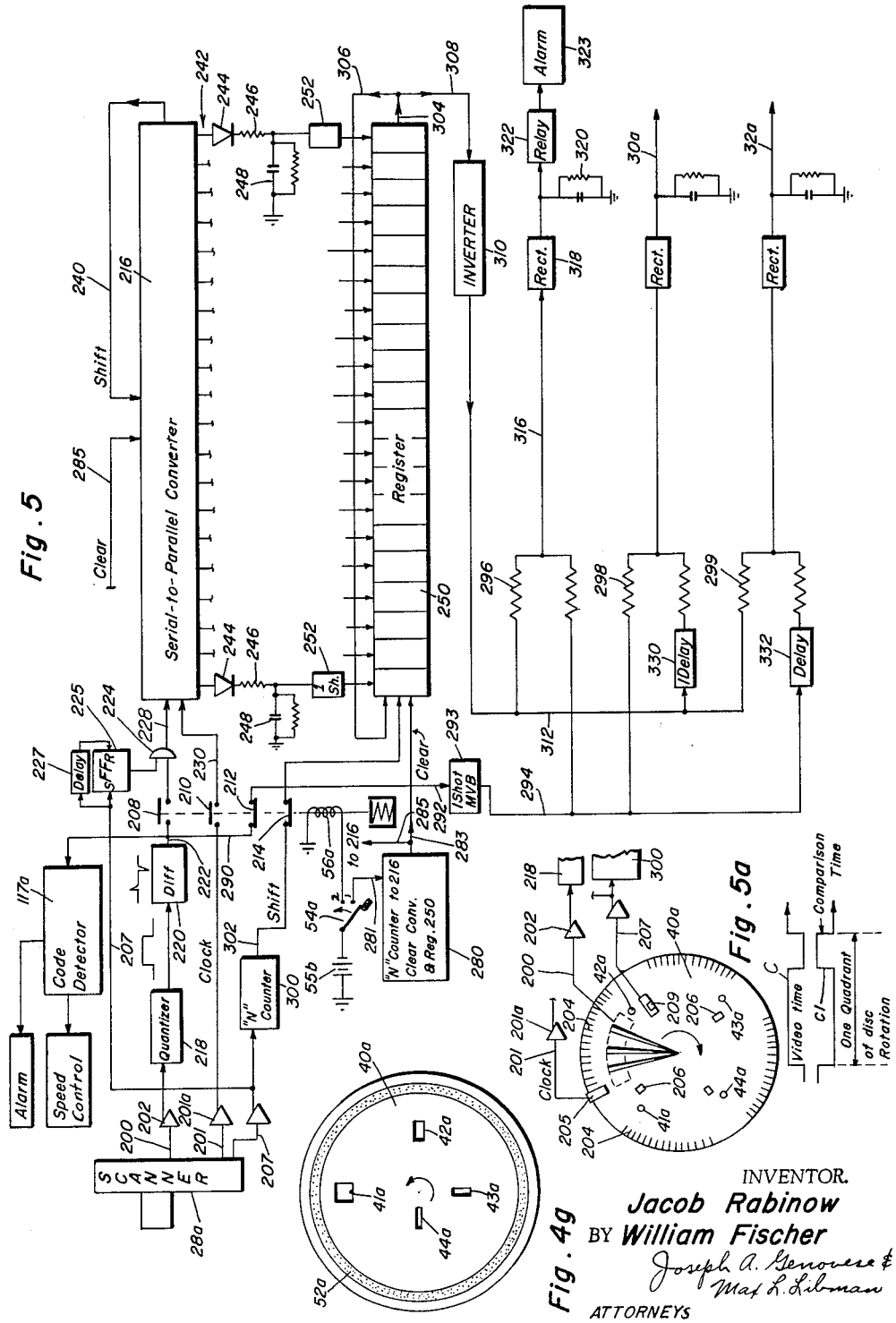

United States Patent Office 3,172,496
Patented Mar. 9, 1965

3,172,496
VEHICLE GUIDANCE BY OPTICAL MEANS
Jacob Rabinow, Takoma Park, and William Fischer, Silver Spring, Md., assignors, by mesne assignments, to Jacob Rabinow, Bethesda, Md.
Filed Jan. 15, 1962, Ser. No. 166,340
28 Claims. (Cl. 180—79)

This invention relates to automatic steering of motor vehicles and particularly to automatic steering systems compatible with existing highways in the sense that very few or no special provisions are required in, or on, or near the highway on which the vehicle operates. The nature of our invention is to rely on one or more guides, either natural or artificial, in any relation to the motor vehicle to maintain the motor vehicle on a preselected course. Our invention uses those features (as guides) of or near a road that are ordinarily utilized by a human operator of a motor vehicle who relies on his eyesight to guide him in steering the vehicle. Thus, the guides may be lines already painted on the highway; they may be shoulders of the highway which contrast with the main section of the highway; or they may be the areas adjacent to the sides of the highway. Since we use intelligence obtained by optical means, the only real requirement for the guides is that they be discernible i.e., optically contrast with the main area of the highway.

The concept of automatically steering a motor vehicle such as a bus, truck, automobile, etc., is very well known. There have been numerous previous attempts to provide a practical system for automatically steering a motor vehicle. However, all prior systems of which we are aware, require special highways or material alteration to existing highways. Prior patents such as Paulus et al., No. 2,317,400 and 2,339,291 require a cable or the equivalent to be embedded in the highway so that an inductive pick up on the motor vehicle can detect the cable and furnish servo control signals for the steering of the vehicle. Obviously, there is resistance to the adoption of any system where it will be necessary to install a cable in the highway. Also, one cannot be certain that the pickup device will distinguish between the embedded cable and the ordinary metal reinforcing used in concrete highways.

Another category of motor vehicle steering systems is exemplified by the Severy Patent No. 2,424,282, Braun Patent No. 2,074,251, and the Sitter Patent No. 2,331,144. Each of these patents disclose photoelectric pickup devices to detect a line on the highway and provide servo correction signals when the motor vehicle deviates from the line. A major difficulty with each of the systems disclosed in this group of patents is that the motor vehicle must straddle the line. This automatically requires an additional and specially located line on every highway where the vehicle's automatic steering is expected to operate. This in itself may not be too difficult, but the presence of an additional line at the center of a traffic lane would surely lead to confusion on the part of motorists not using or having automatic steering systems. Furthermore, automatic steering systems exemplified by the last mentioned group of patents rely on optical means to detect a single line on the road, for example, by photocells directed almost vertically downward beneath the motor vehicle. Thus, only the part of the line below the motor vehicle is detected. Assume that the motor vehicle were operating at a rather high speed and there is an abrupt turn, it is possible that the motor vehicle, not having advance warning of the turn, would attempt to execute an impossible short turn. Additionally, in detecting a line on the road in the shadow of the motor vehicle (beneath it) a special light source is required. The light source and/or photoelectric pickup device is susceptible to ice and dirt accumulations which may adversely effect the operation of either or both.

Our invention is not susceptible to this type of difficulty. We would normally scan a field of view ahead of the motor vehicle and not beneath it. In a sense, our system emulates the usual field of vision of a motorist so that it is possible to anticipate approaching turns, dangers, etc. This feature is of great importance when the motor vehicle is operating at a comparatively high speed. In fact, it is presently throught that automatic steering of motor vehicles is particularly useful in those areas where the highways extend for many miles with very little interruption, allowing high vehicle speeds.

Our system is such that no artificial light is required in the day time. At night ordinary headlights will provide sufficient illumination, although auxiliary lights may be added to illuminate the general area ahead of the motor vehicle. These lights may also serve the motor vehicle operator when the automatic system is not being used. Accordingly, no extraordinary difficulties regarding accumulation of dust, dirt and ice on the sources of illumination can be reasonably expected in our system.

The previous optical systems, as exemplified by the last mentioned group of patents, directly view the line on the highway, as opposed to scanning the general area ahead of the motor vehicle. The act of scanning has a number of advantages such as discriminating against spurious noise produced by an occasional lighter or darker than usual area on the highway. It provides a great deal of detailed information about the highway. By scanning the field of view ahead of the vehicle with a large number of scans, occasional discontinuities in a guide can be ignored since they are only a small fraction of the total information obtained by scanning.

Accordingly, an object of the invention is to provide an optical system for steering a motor vehicle where the field of view ahead of the vehicle is scanned to provide outputs which correspond to the location of one or more guides with respect to the motor vehicle.

The general procedure of our invention is to have a scanner mounted on the motor vehicle to scan an area ahead of the motor vehicle. The scanner detects one or more guides in a field ahead of the motor vehicle, and the position thereof with respect to the motor vehicle is remembered in a memory device. After a brief memory period, subsequent scanner outputs are compared to the memory. Thus, if the motor vehicle should deviate to the left or to the right, or if the highway curves, the deviations are detected and corresponding servo correction signals are provided for operating the steering mechanism of the motor vehicle.

One of the advantages inherent in our system is that the motorist may choose any portion of a traffic lane, i.e. close to the edge of the highway, toward the center etc. Furthermore, if he desires to adjust his position in a traffic lane, he may do so while the motor vehicle continues to operate by simply unloading the memory and reloading it with the vehicle in the new desired relative position on the highway.

Therefore, another object of our invention is to provide an optical scanning automatic steering system where the motorists may select any portion of any traffic lane for operation of his vehicle and/or may readjust his position by an exceedingly simple procedure. As will be later seen, this simple procedure merely involves closing a switch, as by pushing a button.

A further object of our invention is to provide vehicle guidance systems capable of being manufactured at reasonable costs.

There are a number of proximity warning devices disclosed in prior patents, and many of these rely on radar equipment. For the most part they are complex. An advantage of our invention is that our system has a vehicle proximity warning feature which is simpler than any proximity device of which we are aware. It should be understood, however, that proximity devices other than those shown and described herein may be used together with our invention, either to supplement or to replace our proximity warning feature.

The terms "guide" and "guide lines" as used herein are defined as any optically detectible longitudinal mark or marks of, or on, or near a highway. Such marks may be painted lines, or physical parts of the highway itself, and/or the areas adjacent to the edges of the highway. Although the term "highway" has a restricted meaning in some fields, as we use the term it means any road, street, surface or the like on which vehicular traffic customarily operates.

Other objects and features of importance will become apparent in following the description of the illustrated forms of the invention which are given by way of example only.

FIGURES 1–1d are perspective views showing different kinds of highways with vehicles equipped with our automatic steering systems thereon.

FIGURE 2 is a fragmentary perspective view showing a stretch of highway as it appears to the motorist.

FIGURE 3 is a diagrammatic side sectional view showing a scanner used in our system.

FIGURE 4 is a schematic view showing a magnetic recording embodiment of our invention.

FIGURE 4a is a schematic view showing means to adjust the scanner in accordance with the steering of the vehicle, as demonstrated in FIGURE 1d.

FIGURE 4b is a fragmentary view similar to FIGURE 4a and showing that it is possible to adjust the lens of the scanner to correspond to the steering of the vehicle, instead of the entire scanner.

FIGURES 4c–4f are groups of curves explaining part of the embodiment of FIGURE 4.

FIGURE 4g is an elevational view showing a modification of the scanning disc in FIGURE 4.

FIGURE 5 is a schematic view showing another embodiment of our system.

FIGURE 5a is an elevational view showing a scanning disc used with the embodiment of FIGURE 5.

RÉSUMÉ OF THE SYSTEM

Figures 1, 1A, 1B:
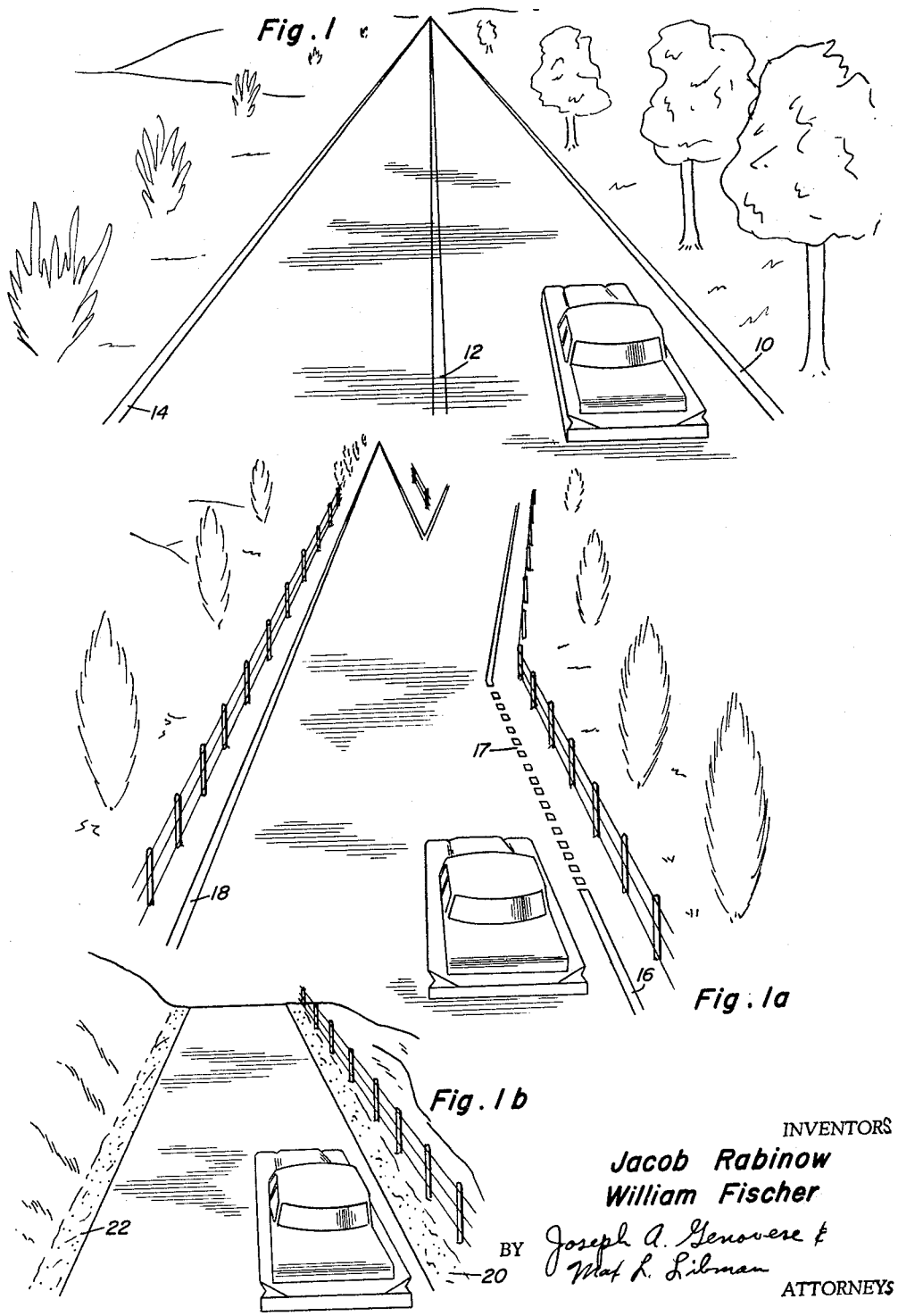

FIGURE 1 shows a motor vehicle on a four-lane highway divided into "north bound" and "south bound" traffic respectively by guides 10, 12 and 14. In this instance, the guides are painted lines such as are on many miles of our existing highways. This view, as the others in the group 1–1d, shows that the guides are optically discernable and are, in fact, the usual lines of the highway. FIGURE 1a shows a vehicle on a different type of highway having guides 16 and 18 with the guide 16 provided with a code 17 at the approach of an intersection. Code 17 diagrammatically represents any suitable code for indicating the approach of an intersection, a danger zone, a speed limit, etc. The code, when used, is the only modification of (or supplement to) ordinary traffic lane defining lines on highways that will be required. FIGURE 1b shows a highway where the guides 20 and 22 are shoulders of the highway itself. There are many miles of highways composed of roads of this type. Our system is perfectly operative on roads of this nature. FIGURE 1c shows a highway similar to FIGURE 1 but with a curve in it. As will later be seen, our system provides an anticipation signal obtained from the vehicle from the stretch of highway in advance of the vehicle itself. FIGURE 1d shows a motor vehicle on a curved part of a highway having guides 24 and 26 at its edges. This view shows that the guides 24 and 26 can be curbs, and also shows a field-of-view adjustment (FIGURES 4a and 4b), described later.

FIGURE 2 shows a part of a highway as it would appear from the vehicle operator's position. The highway is "seen" by scanner 28 in the same way, i.e. as a long ribbon with the edges converging at infinity. Scanner 28 is secured to a convenient part of the motor vehicle, for instance the position shown in FIGURE 2 behind the windshield, behind the radiator grill, in front of the vehicle, etc. The purpose of the scanner is to obtain information continuously from the highway as the motor vehicle travels on the highway.

The principle of operation of our invention is to optically determine the position of the motor vehicle with respect to one or more guides on or near the highway. This determination is made by projecting an image of the highway onto a scanner and providing scan output signals with time-spaced information corresponding to the spacing between guides. The signal is derived as follows: As the motor vehicle operates on the highway, the field of view ahead of the vehicle is transversely scanned by the scanner 28 so that the output signals from the scanner correspond to the actual instantaneous position of the vehicle with respect to the guides. Typical guides, as shown in FIGURE 2, are located to the left and right of the motor vehicle and extend to infinity in front of the vehicle. However, the guides need not necessarily be in this relative position. The vehicle may straddle one of the guides, for instance the center line of a divided highway, should the motorists be so disposed to operate his vehicle. For simplicity, we shall assume that the guides are on the left and right side respectively of the motorist (FIGURE 2).

At the command of the vehicle operator a sequence of scanner output signals are integrated (or the equivalent) and recorded in a memory device (magnetic in FIGURE 4 and non-magnetic in FIGURE 5). Thereafter, subsequent output scanner output signals are compared to the stored information in the memory. If there is any deviation, that is, the vehicle drifts to the left or right or the vehicle enters a curve in the highway, this deviation is detected and an output signal produced, for instance on lines 30 and 32 (right side of FIGURE 4) to provide steering correction for keeping the motor vehicle on the preselected course. Lines 30 and 32, shown in FIGURE 4, are conductors of the servo correction signals which are described in detail later. In this view they are shown operatively connected with a spool valve 34 of a "power" steering system in a motor vehicle. Since it is unimportant to our present invention exactly how the correction signals are used, it may be assumed that the spool valve 34 is the same as the corresponding valve in the U.S. Patent No. 2,424,288.

In order to obtain some idea of the efficacy of the transverse scanner on a motor vehicle, assume that the scanner consists of a motor operated scanning disc 40 (FIGURE 4) having four equally spaced scanning apertures 41–44 (each producing one scan or scan trace every revolution of disc 40) near its periphery. Also, assume that the scanning disc is rotated at 60 r.p.s., whereby the four scanning apertures result in 240 scans per second of the image of the highway projected onto the face of the scanning disc, e.g. by lens 46 (FIGURE 3). Now assume that the motor vehicle is traveling 60 miles per hour, i.e. 1056 inches per second. Since there are 240 scans per second, approximately every 4½ inches of the highway is transversely scanned as the motor vehicle travels at 60 miles per hour.

An enormous amount of scan-information regarding the highway can be obtained even at these speeds.

FIGURE 4 SYSTEM

The scanning disc 40 is a part of a scanner 28 shown in FIGURE 3 and has two photoelectric pickup devices 48 and 50 located behind the disc, i.e. behind the surface on which the image of the highway is projected by lens 46. The scan apertures 41–44 are uniformly spaced from the axis or rotation of the disc although we may use Nipkow disc 40a (FIGURE 4g) having apertures 41a–44a. In some respects the Nipkow disc 40a has advantages over disc 40. For example, with the apertures arranged as shown, they examine the highway image well in advance of the vehicle as well as the area closer to the front of the vehicle. In addition, the Nipkow disc apertures are radially spaced from the disc axis different distances, but the guides of the image converge toward the disc axis. As a result, the intercepts of the image will be equal in time so that the scan information derived by each aperture 41a–44a is compatible. In other words, aperture 41a has a higher linear speed than aperture 44a, but the part of the image traversed by aperture 41a is wider than the part of the image transversely scanned by aperture 44a. The images of the guides scanned by the outer apertures are wider than those scanned by the inner apertures and the linear speeds are different. Thus, the apertures are made of a width to correspond thereto. Although we have shown only one group of apertures 41a–44a, it is understood that a greater or smaller number of apertures can be used.

A magnetic track 52 is formed on one surface of disc 40 (corresponding track 52a is on disc 40a). The track 52 forms a memory device for the output signals from photocell 48. For a brief period, signals are recorded on track 52 by head 76 (described later), and they represent the desired course on a highway. We have a special method for recording these signals so as to neglect occasional spurious information and noise, for example, as would be provided by a piece of paper or dirt on the highway between guides during the memory recording period.

When the motorist has his motor vehicle moving on a selected part of the highway, that is, where he wishes to operate the vehicle, his only operational requirement is to close switch 54 (upper part of FIGURE 4 and FIGURE 2) which operates a conventional self stepping relay 55 connected to an electrical source circuit 55a. Relay 55 first conducts an erase signal over line 90 to erase head 92 juxtaposed over memory device signal track 52. Thus, as the disc 40 rotates any previously recorded signals on track 52 are erased. The next function of relay 55 (when it steps) is to discontinue the erase signal and energize a conventional time delay relay 56. The time delay relay has six sets of contacts 57, 58, 60, 61, 62 and 63 (hereafter, called switches) which are concurrently operated. Some are opened while others are closed; however, only those pertinent to the memory recordation period are discussed at this time. Thus, when relay 56 is operated to a first position, switch 57 is opened; switch 58 closed; and switch 60 moved to position 60a. The photocell 48 has an output line 64 with an amplifier 66 therein. Switch 57 is interposed in line 64 and thus, this line is opened allowing no signals to enter the inverter 68 which is described later. However, the scanner outputs (produced for example as scan hole 44 traverses the image of the highway shown projected on the disc 40 in FIGURE 4) are conducted on line 64; line 70 attached to line 64; through the now closed switch 58 and to the mixer 72. The signals are passed by the mixer 72 and are conducted on line 74 to be recorded on track 52 by means of recording head 76. Thus, each scan trace of the image on disc 40 is recorded on track 52 as a signal S as long as the relay 56 is in the first position. Since there are four quadrants of disc 40 established by the four scanning holes 41–44, there are four separate signals S recorded end-to-end on the circular track 52. With the arrangement shown, after the first two quadrant signals S are recorded (due to magnetic-head spacing) subsequent recordation of signals is accompanied by a concurrent readout of previously recorded signals as described below. Read head 80 which is super-imposed over track 52 and ninety degrees removed from head 76, reads out the previously recorded signals and conducts them over line 82. The signals are amplified at 84 and conducted through the switch 60 of relay 56 and over line 86 to the mixer 72. Since these signals are derivative signals, integrator 87 is in line 86. From now on during the memory recording period the photocell output signals are conducted on lines 64, 70 and are mixed at 72 with previously recorded signals obtained from track 52. These are re-recorded on track 52 so that the signals S build up in strength to correspond to the repetitive information obtained from scanning transversely across the highway ahead of the motor vehicle. This is analogous to signal integration features described later (at 248) in connection with the embodiment of FIGURE 5.

Assuming that the relay 56 remains in its first position for a few seconds (depending on the adjustment of the time delay), several hundred scans will establish the finally remembered signal S on track 52. If this number is insufficient, the time delay of relay 56 can be adjusted to produce a longer memory period. To make certain that previously recorded signals on track 52 will not effect the memory, the erase signal on line 90 erases track 52 each time that the motorist operates switch 54. Thus, any time a vehicle operator wishes to change his course, or when the nature of the highway changes radically, he need only manually steer the vehicle to the part of the highway on which he decides to operate and then close switch 54. As explained before, the first thing that happens is that the signal S is erased and then the time delay relay 56 is operated to its first position to record a new memory signal S.

Assume now that signal S corresponding to the desired position on the highway is recorded on the track 52 of the disc 40. This means that the relay 56 has been operated to its first (record) position and has returned to its rest position with all switches 57–63 in the position shown by the full lines. Swith 58 will be open; switch 60 will be in position 60b, and all of the other switches of relay 56 are closed. This means that the outputs from the photocell 48 are no longer conducted to the head 76, and the outputs from head 80 no longer reach the mixer 72. The photocell output signals obtained as the successive scanning apertures 41–44 sweep across the image projected on the disc 40, are conducted on lines 64 through closed switch 57 to the inverter 68 and to various other points of the system. Line 96 from the inverter conducts the inverted scan signals to a plurality of comparators. Thus, line 96 is connected to a distribution bus 98. The scan information signals on bus 98 (henceforth called video signals) are compared by a comparator 100 to the non-inverted signals from the memory device by way of line 102. Line 102 is connected with the switch 60 at 60b which is fed with amplified video information from head 80. Consequently, the inverted video signal is compared to the memory signal from track 52. The comparator 100 is schematically shown as two resistors connected in parallel. Thus, if the video and memory signals are in phase, the information of each of these signals algebraically adds to zero and is conducted on the comparator output line 108. The video and memory signals are indicated by the curves shown in FIGURE 4c. The signal on line 108 is rectified at 110 and filtered at 112. The filter has a reasonably long time constant so that small spurious noise is minimized. Line 108 is connected with a voltage level detector 114, for instance, a voltmeter, and an alarm system is operatively connected with the level detector. The alarm system can perform various functions such as sounding an alarm, illuminating a light, applying the brakes of the motor vehicle, etc. Summarizing the function of comparator 100, it constantly sees whether the motor vehicle is following the course that has been selected by the vehicle operator. As long as the vehicle is following this course, the level detector 114 provides no output to operate the alarm system 116. However, should the video signal (see FIGURE 4d) shift or change in wave form (for instance suppose suddenly the highway had only two guides instead of three) an alarm will be given.

We have a code detector, for instance a tuned circuit 117 to provide a signal when a code such as code 17 in FIGURE 1a, is detected. For this function the video signal on bus 98 is used as an input to the tuned circuit 117. When there is resonance or when the tuned circuit 117 otherwise becomes satisfied with the signal on line 98, the output line 122 of the tuned circuit provides a signal by which to reduce the throttle setting of the motor vehicle, sound an alarm, energize a lamp, etc. The various alarm systems mentioned herein are conventional, there being many disclosures in the prior art showing means for applying brakes, reducing throttle settings, lighting lamps, sounding audible devices, etc.

Comparators 126 and 128 are used to derive the previously mentioned signals on line 30 and 32, i.e. those for producing servo corrections in the steering system of the motor vehicle. Comparator 126 can provide, for example, a left turn correction whereas the comparator 128 would then provide a right turn correction. The comparators operate by detecting phase shift between the inverted video signals and "lead" and "lag" signals obtained from the memory. The lead signal is obtained from head 130 juxtaposed to the magnetic track 52. Head 130 is slightly advanced (with regard to the direction of rotation of disc 40) on the disc and the output signal should lead the video. The lag signal is obtained from read head 132 which slightly lags each quadrant of the track containing signal S. Thus the lead signal on line 134 from head 130 is amplified as at 136 and conducted through the now closed switch 61 to one input terminal of the comparator 126. This is compared to the video signal from bus 98 and provides comparative signals as schematically shown in FIGURE 4d. The output line 140 of comparator 126 conducts the composite signal d FIGURE 4d which is rectified at 142 and filtered at 144 before being impressed on line 30 which is the output line from the rectifier 142. At the same time the lag memory signal from head 132 is conducted on line 146 and is amplified at 148. This amplified signal is conducted through the now closed switch 62 to the lag memory resistor of comparator 128. The wave forms of the comparator will be as shown in FIGURE 4e. Thus the output line 150 from comparator 128 conducts a signal e which is rectified at 152 and filtered at 154 to be conducted on line 32. Accordingly when the motor vehicle is following a course corresponding to the course established by the signal S in the memory device, the signals on line 130 and 132 will be equal and opposite so that no correction of the course is called for. However, by observation of FIGURES 4d and 4e, it is evident that if the highway curves or the vehicle should attempt to drive sideways (for instance by a cross wind on the highway) there will be a corresponding phase shift between the video signals and the lag memory signals and between the video signals and the lead memory signals to produce a change in the output of the comparison circuits and this will produce unequal servo correction signals on lines 30 and 32.

The final comparator 160 serves as a proximity warning device. The inverted video signal on line 98 is one input to the comparator 160 and the other input is the second video signal conducted on line 162 which is derived from the previously mentioned second photocell 50. This photocell has its separate set of scan apertures 164 arranged at a different distance from the center of rotation of the disc. The effect is to examine the field of view over greater distance and further ahead measured in the direction of vehicle travel. Since the apertures 164 are located nearer the apex portion of the image, they examine the field of view more distant ahead of the motor vehicle. Thus, the photocell outputs conducted on line 162 through the now closed switch 63 are compared by comparator 160 to the inverted video information obtained from the photocell 48. These video signals should add to zero as shown in FIGURE 4f whereby the output on line 166 of the comparator 160 would be rectified as at 168 and filtered as at 170 to produce a signal incapable of operating an alarm or the equivalent. The filter 170 has a time constant which is longer than the filters 144 and 154. Thus, if another motor vehicle is ahead of the automatically steered motor vehicle, its presence will be noted in the second video signal on line 162. If it happens that the second motor vehicle is simply crossing the road several miles ahead, or if it passes in the opposite direction, the long time constant of filter 170 will allow this vehicle to be ignored. However, if the motor vehicle in the distance persists or moves slowly relative to the vehicle, as when another motor vehicle is being approached from the rear, the alarm 172 will be given.

The last described feature of our invention, i.e. the proximity warning feature is thought to be far simpler than prior proposals for serving the same purpose, for example, continuous-wave radar proximity devices. This is true even if we elect to have a separate magnetic track on disc 40 especially for a proximity warning memory signal, and compare it with the second video output from photocell 50—much the same as we record on and read out from track 52. Further, although not illustrated in FIGURES 5 and 5a with regard to the non-magnetic recording form of our invention, this feature can obviously be incorporated therewith.

The description of the magnetic embodiment (FIGURE 4) of our invention is simplified in many ways to simplify the disclosure. For example, signal S will not physically appear on track 52 as shown. It is shown as a line to represent its information content. The signals read out from the track 52 (and 52a) by the usual magnetic heads are derivative signals and so the amplifiers for the read heads should be integrating amplifiers or the equivalent. Conversely, the video signals can be passed through differentiators and be compared to the signals picked up by the magnetic heads.

When a motor vehicle is in a turn on a highway, for instance as in FIGURES 1c and 1d, the instantaneous fields of view of the scanner are not straight down the highway. As shown in these figures, the scanner would be "looking" across a field adjacent to the highway. It is true that when the vehicle is located as shown in FIGURE 1c, our system would provide servo correction to steer the vehicle around the curve, and the time constant of filter 170 could be long enough for the vehicle to make the curve without opearting alarm 172. However, another way to overcome the difficulty is to mount the scanner 28 on a vertical pivot 29 (FIGURE 4a) and adjust the scanner (in azimuth) by an angle correctly related to the steering movement of the vehicle wheels. This obviously may be accomplished in many ways, perhaps the simplest being a Bowden wire 31 connected to the steering linkage and to the scanner case by a rack and pinion, gear reducer mechanism. Another, and perhaps simpler way to obtain the same result is to move the lens 46 and its holder 46a (FIGURE 4b) while keeping the case of the scanner in a fixed position. The lens holder 46a can be moved left or right by being mounted on a slide and by using any suitable linkage or mechanism such as Bowden wire 31a. In further explanation of this feature, the field of view of the scanner is changed to correspond to the adjustment of the two front wheels of the motor vehicle (FIGURE 1d). In executing a turn, for example an arcuate turn as shown, the front wheels of the vehicle should be kept tangent to the arc, otherwise the vehicle will be turning on an arc whose radius is different from the highway. Thus, if the scanner (FIGS. 4a or 4b) is coupled to move with the steering adjustment of the vehicle wheels, the optical axis of the scanning system will (like the steered wheels) be tangent to the curve in the highway. This overcomes the problem of the scanner view being even momentarily off the highway (see FIG. 1c).

FIGURES 5 and 5a

FIGURES 5 and 5a schematically show a form of our invention which relies on digital techniques and equipment. Scanner 28a is mounted like scanner 28 but has a different scanning disc 40a (FIGURE 5a). Instead of using the disc 40a as a memory device as in FIGURE 4, the memory device is separate. This, and the fact that computer type circuitry is used, are the only essential differences between the embodiments of FIGURES 4 and 5. Scanning disc 40a has four scan apertures 41a–44a sub-dividing the disc into four quadrants.

The timing diagram (beneath FIGURE 5a) shows that each quadrant has a scan ("video time") followed by a "comparison time." This is mentioned again later, but briefly, when a scan aperture completes its traverse of the image, there is a very brief interval (called "comparison time") before the next scan aperture begins to scan the image. During the "comparison time," several logic functions are performed.

Just as in FIGURE 4, the image of the highway ahead of the vehicle is projected on one face of the scanning disc. The scanning apertures interrogate the highway image and provide photocell outputs (video) on line 200 which are amplified at 202. The disc has four quadrants of clock pulse signals 204 recorded near its periphery, and four shift pulse signals 206 recorded near the ends of each quadrant. The use of the clock pulse and shift pulse signals are described subsequently. As in the embodiment of FIGURE 4, we have a single switch 54a adapted to be manually operated by the motorist to select his course on a highway. Like the corresponding switch 54, the initial function of the switch is to "erase" the information stored in the memory and a conventional series to parallel converter 216. However, the memory in this form of our invention is a recirculating digital shift register 250 of "N" stages (described later). Accordingly, instead of an "erase" head as in FIGURE 4, we have a preset counter 280 of "N" pulses where "N" is equal to the number of stages in the register 250 and converter 216. The counter is triggered by a signal on line 281 every time switch 54a is operated. The output of counter 280 is conducted over lines 283 and 285 to the register and converter respectively to clear these devices, i.e. reset all stages thereof to a given state (usually a zero state).

The next function of switch 54a (when it is moved from position 1 to position 2) is to operate time delay relay 56a which serves the same general purpose as time delay relay 56. Switch 54a is schematically shown connected with a potential source circuit 55b, and as in FIGURE 4, we can use the switch 54a to operate a relay which would correspond to relay 55.

Relay 56a has four sets of contacts (hereafter called switches 208, 210, 212 and 214) which are operated concurrently. When relay 56a is first operated, switches 208 and 210 close, and switches 212 and 214 open. The switches 208 and 210 when closed, establish the time during which the converter is loaded with video information. When they open, no information can reach the converter. Although converter 216 (and register 250) are cleared before loading by the clear signal on line 283 (described before), we must make certain that the converter begins to load at the beginning of a scan quadrant and not at any other place such as the middle of a scan.

AND gate 224 and flip flop 225 serve this purpose, as will be seen later.

During the load cycle of converter 216 (during the time that switches 208 and 210 are closed), the amplified signal on line 200 is quantized at 218 and differentiated at 220 so that during scanning the transitions (light-to-dark and dark-to-light) in optical density of the highway surface and guides appear as sharp spikes. The differentiated output on line 222 is impressed on code detector 117a (the same as 117), and is conducted through the now closed switch 208 to form one input to an AND gate 224. The other input of the AND gate is the output of flip flop 225 which is set by the amplified signal on line 207. This signal (mentioned again later) only occurs at the end of a "video time" (below FIGURE 5a). Thus, nothing can pass AND gate 224 until the flip flop is set at the proper time to avoid the possibility of starting to load converter 216 during a scan line. The flip flop can be reset any time after the converter loading cycle, i.e. when relay 56a steps to its second position by a connection with switch 212 or 214, or by a delayed feedback line 227.

The clock pulse signals on line 201 (read out by head 205, FIGURE 5a) are amplified at 201a, are conducted to switch 210 and then to the stage-by-stage shift terminal of converter 216 via line 230. Summarizing, when relay 56a is actuated to its first position, video information is conducted to gate 224, but cannot pass until flip flop 225 is set. Thereafter the video information (binary one's or zero's) is conducted on line 228 from gate 224 to the load terminal of converter 216. The converter is stepped stage-by-stage by the clock pulses on lines 201, 230, thereby stepping the converter in time with the rotation of disc 40a.

Assuming that there is a single clock pulse (in each quadrant of disc 40a) corresponding to each stage of the converter 216, the converter will be completely serially loaded when a scan aperture of one quadrant of the scanner disc 40a has completely investigated the image of the highway. Thus (see timing curves below FIGURE 5a) each quadrant of disc 40a contains a group of clock signals 204 followed immediately by a shift pulse 206 which initiates a comparison cycle which is completed before the next group of clock pulses (called "video time" on curve C). The details of the comparison cycle (curve C1) are described later. All of the stages of converter 216 are simultaneously unloaded when the last stage of the converter receives a bit (binary one or zero) of information. This may be accomplished in numerous ways, e.g. by counting the input pulses, or by simply connecting shift line 240 to the last stage of the converter and to the parallel-shift terminal of register 216. Thus, the data (binary ones and zeros) corresponding to the highway general area and guides stored in the stages of the converter are conducted over parallel lines 242 to memory register 250. There is one line 242 connecting (each) stage of converter 216 with the corresponding stage of memory register 250 which is loaded in parallel and serially unloaded. Each line 242 has a unidirectional device interposed therein for instance, diode 244, a limiting resistor 246 and an integrator circuit 248. In addition, each line 242 has means to establish a threshold above which an information bit will be stored in the memory device 250. The threshold establishing means are illustrated as one-shot multivibrators 252. Accordingly, assume that the time delay relay 56a is adjusted so that several thousand scans occur during the time that the relay is in the energized position (switches 208 and 210 are closed, and switches 212 and 214 are open thereby inhibiting the shift signals 209). The converter 216 will be rapidly loaded and unloaded with binary ones and zeros representing successive scans of the highway image. The signals corresponding to the binary ones, if repetitive at the same stages of converter 216 will cause the capacitors of the integrators 248 to build up a charge before it can be dissipated to ground. Finally, the threshold of the corresponding one-shot multivibrators 252 will be reached and they will fire, thereby setting (storing a binary "one") a corresponding stage of register 250. The effect of the group of integrators is to ignore spurious signal and noise which may be obtained from the highway during scanning. We have now described how our memory device is loaded with information that would correspond to the image of the highway ahead of the motor vehicle. Note that the stored image in register 250 uses the motor vehicle as a reference in the sense that if the motor vehicle were a little to the left or a little to the right at the time that the switch 54a is closed the remembered image in register 250 would be shifted a corresponding small distance to the left or the right.

Now assume that the time delay relay 56a has moved to its rest position (as shown in the drawing). Switches 208 and 210 are now open so that further video information does not reach the converter 216, and therefore, the information in register 250 is retained. This information corresponds to the scanned image of the highway ahead of the vehicle. The closing of switches 212 and 214 causes a comparison between the memory signal and the subsequent incoming video signal, i.e. starts the above-mentioned comparison cycle (curve C1). This is achieved as follows: Line 290 is connected to the differentiated video signal line 222, and to one terminal of switch 212. The video signals (during each "video time," FIGURE 5a) are conducted from switch 212 on line 292 through a pulse shaper, for instance a one-shot multivibrator 293, which fires each time that a spike occurs. The video signal from the one-shot multivibrator 293 is conducted on bus 294 to comparators 296, 298 and 299, forming one input of each. The other input of each comparator is the remembered signal in memory device 250. The shift register memory device 250 has been described as loaded in parallel over lines 242. It is run out serially by the amplified shift pulse signal on line 207 which is obtained from the read head 209. This head reads out a shift pulse 206 near the end of each quadrant, which is used to fire a multivibrator 300 of "N" pulses. This can be a conventional multivibrator-counter combination providing "N" pulses where "N" is the number of stages in the memory register 250. The output line 302 from the multivibrator 300 is conducted through the now closed switch 214, and to register 250 to shift out the remembered signal in the register 250. The remembered signal is conducted on line 304 and recirculated over line 306, i.e. fed back serially into the register 250. The signal is also conducted on line 308 and inverted at 310. The inverter provides an output signal on bus 312 from memory device 250 which is fed to comparators 296, 298 and 299 respectively. These correspond to comparators 100, 126 and 128 of FIGURE 4.

Comparator 296 compares the inverted memory signal with the video signal to provide an output on line 316 which corresponds to the guide-following line 108 of comparator 100 in FIGURE 4. The signal on line 316 is rectified at 318, filtered at 320 and is used to operate a relay 322 which controls an alarm 323. The filter 320 could be substituted by a digital counter for mis-matches in this form of our invention.

We previously indicated that the photomultiplier 50 (FIGURE 4a) and its associated circuit provide an advance warning which can be used in the system shown in FIGURE 5. However, the comparator 296 may be used for the same purpose, i.e. in addition to the guide line following function, the output on line 316 will also indicate a mis-match between the inverted memory signal and the video signal if an obstruction persists in the field of view of the scanner.

Comparators 298 and 299 correspond to the comparators 126 and 128 of FIGURE 4. However, instead of phase shifting the video as we have done in FIGURE 4, we find it convenient to disclose the equivalence between "phase shifting" the memory device output signal and the video. Thus, the video input to comparator 298 from bus 294 will lead the memory signal on line 312 by interposing a one-stage delay 330 in the memory leg of the comparator 298. The video signal will lag the memory signal if we interpose the same duration delay 332 in the video signal input of comparator 299. The signal comparison, then, will function in the same manner as those of the comparators 126 and 128 in order to produce servo-correction signals on lines 30a and 32a respectively.

The described embodiments of our invention are given as examples only. It is understood that all forms of our invention falling within the claims may be resorted to without departing from the protection thereof.

We claim:

1. In an automatic steering system for a vehicle which has steering means, and where the course over which the vehicle operates has optically discernible guide means, means on the vehicle to produce an image of a field of view including said guide means ahead of the vehicle, means to transversely scan the image of said field to detect said guide means and provide outputs corresponding to the relative position of the vehicle with respect to said guide means, and means responsive to said outputs for providing a correction signal for said steering means.

2. The system of claim 1 wherein said guide means are laterally spaced lines, said image-producing means are focused on said course considerably ahead of the vehicle so that said lines appear in the said image, and a component of motion at an angle to the direction of scanning of said scan means is provided by the forward motion of the vehicle.

3. The steering system of claim 2 wherein said steering means are servo-controlled and said correction signal is a servo signal.

4. The system of claim 1 wherein said guide means include lines, at least one of said lines having a code which is detectible by the same said scanning means to provide a signal separate from said correction signal.

5. A steering system for a vehicle to maintain the vehicle on a prescribed course which has visual means defining the vehicle course in the direction of vehicle travel, means to form an image of said course including said visual means ahead of the vehicle, scanning means on the vehicle to scan said image and detect said visual means in said image and provide outputs corresponding to said visual means using the vehicle, as a reference for scanning so that yaw deviations of the vehicle from said course are detectible from said outputs of said scanning means.

6. A steering system for maintaining a moving vehicle on a course which is determined by visual guide means, the vehicle having steering means which are actuated to keep the vehicle on course, said system comprising means to optically scan a field of view of the course including said guide means ahead of the vehicle, said scan means providing scan trace outputs, said outputs having signal information corresponding to the relative position of said vehicle with respect to said guide means and the space near said guide means, means to store said signal information in a manner to correspond to said course, and means to subsequently compare said stored information with subsequent scan outputs and provide a servo correction steering signal for said steering means.

7. In a motor vehicle having vehicle-steering means, automatic operating means for said steering means to retain the vehicle on a course having a guide, optical scanning means operative transversely to said course and said guide, a memory, means to load data from said scanning means into said memory to establish a selected relative position of the vehicle relative to said guide, means for comparing subsequent scanning means outputs to information stored in said memory and provide a servo correction signal for said steering means in response to deviations of said vehicle from said course as defined by the data in said memory.

8. An automatic steering system for a vehicle having steering means to keep the vehicle on a course defined by visual guide means; said system comprising an optical scanner for the field of view ahead of the vehicle, said scanner attached to the vehicle so that the vehicle is the reference for scanning and the forward movement of the vehicle provides one component of scan motion, means associated with said scanner to provide electrical outputs modulated with data corresponding to said guide means and the relative position of the vehicle with respect thereto, and data processing means to provide a servo correction signal in response to deviations of the vehicle from a preselected position with respect to said guide means.

9. An automatic steering system for a vehicle having steering means to keep the vehicle on a course defined by visual guide means; and said system comprising an optical scanner for transversely scanning the field of view ahead of the vehicle, said scanner attached to the vehicle so that the vehicle is the reference for scanning and the forward movement of the vehicle provides one component of scan motion, means associated with said scanner to provide electrical outputs modulated with data corresponding to said guide means and the relative position of the vehicle with respect thereto, data processing means to provide a servo correction signal in response to deviations of the vehicle from a preselected position with respect to said guide means, said data processing means including a memory device to store a signal which corresponds to the desired position of the vehicle with respect to said guide means, and means to compare said electrical outputs to said signal as said vehicle moves to provide said servo correction signal.

10. The automatic steering system of claim 9 and means under the control of the vehicle operator for changing said signal to thereby allow the vehicle operator to select a different vehicle position with respect to said guide means.

11. The automatic steering system of claim 10 wherein said signal changing means are capable of being actuated while the vehicle is in motion.

12. The automatic steering system of claim 8 wherein said guide means are on opposite sides of the vehicle and optically contrast with the main area of the roadway.

13. The automatic steering system of claim 9 and; means for movably mounting said scanner with respect to the vehicle, and means to adjust said scanner in accordance with the direction and magnitude of movement of said steering means.

14. The automatic steering system of claim 9 wherein said guide means are lines, a portion of at least one of said lines having a code, and means to detect said code and provide a signal corresponding to the code.

15. In a motor vehicle having automatic steering means, a steering system to retain the vehicle on a course defined by a visual guide on each side thereof and extending ahead of the vehicle, means to optically examine said course ahead of the vehicle at least two longitudinally forwardly spaced positions and provide outputs corresponding to the relative position of the vehicle between said guides, means responsive to said outputs for providing vehicle steering signals, and means for impressing said steering signals on said automatic steering means.

16. In a motor vehicle having automatic steering means, a steering system to retain the vehicle on a course defined by at least one guide parallel to direction of travel and extending ahead of the vehicle, means for optically examining said course ahead of the vehicle and for providing outputs corresponding to the position of the vehicle relative to said guide, and means responsive to said outputs for detecting deviations of the vehicle from a predetermined position relative to said guide and for providing corrective steering signals to said steering means to return the vehicle to said predetermined position.

17. The subject matter of claim 16 wherein said examining means include means to optically transversely scan said course ahead of the vehicle.

18. In a motor vehicle having steering means, a system to automatically steer the vehicle on a selected part of a course which is defined by optical guides along at least one side of the course, an optical scanner on the vehicle to transversely scan the course ahead of the vehicle, means providing outputs from the scanner which are modulated with data corresponding to the position of said guide with respect to said vehicle, a memory device to remember a signal corresponding to said outputs when the vehicle is in an operator-selected position relative to said guide, and means to compare subsequent outputs with said remembered signal and provide steering-means operating signals in response to deviations of the vehicle-reference from said selected position relative to said guides.

19. The subject matter of claim 18 and means operable while the vehicle is in motion to remove said remembered signal and provide a new signal for said memory device which corresponds to a new vehicle position relative to said guides.

20. In an automatic steering system for the steering means of a vehicle, a scanner having a rotary scanning disc provided with scan aperture means, means to form an image on said disc of the course ahead of the vehicle where said course has guides which converge in said image toward the center of rotation of said discs so that successive scans of the image by said aperture means yield equal intercepts in time even when the aperture means are apertures which are spaced different distances from said center of rotation, means responsive to the outputs of said scanner to store a signal corresponding to said course, and means to compare subsequent scanner outputs to said stored signal to provide a steering means correction signal.

21. In an automatic system for a vehicle, an optical scanner to scan a field of view ahead of the vehicle and provide outputs corresponding to said field, means to store information derived from said outputs and defining said field, and means to compare subsequent scanner outputs with said stored information and to provide a signal signifying a change in said field.

22. The system of claim 21 wherein said vehicle has a steering means and the last mentioned signal is a steering means operating signal.

23. The system of claim 21 wherein the last mentioned signal is a proximity signal.

24. A vehicle attachment comprising an optical scanner for a course ahead of the vehicle where the course has a guide extending lengthwise of the direction of vehicle travel, said scanner having a first and a second transducer providing two sets of signals corresponding to transversely scan traces ahead of the vehicle and farther distant ahead of the vehicle respectively, means to compare said sets of signals and provide a new signal when the comparison of said sets of signals show differences which persist beyond a predetermined time so that an instantaneous difference is ignored but a persistent difference is signaled by said new signal.

25. In an automatic system to maintain a vehicle on a course having guide means ahead of the vehicle, said system comprising an optical scanner to transversely scan said course and provide outputs modulated with information of said guide means, averaging means for said outputs to provide memory signals containing the repetitive information regarding said guide means, means to remember said memory signals, and means to compare subsequent scanner outputs to said memory signals for providing a new comparison signal.

26. A vehicle attachment for an automatic steering means of a vehicle, said attachment comprising an optical scanner for a course ahead of the vehicle, said scanner having a first and a second transducer providing two sets of signals corresponding to scan traces ahead of the vehicle means to compare said sets of signals and provide a new signal when said comparison indicates a predetermined condition exists, and means to conduct said new signal to said automatic steering means.

27. The attachment of claim 26 wherein said first transducer provides a first set of signals corresponding to the area ahead of the vehicle, and said second transducer provices a second set of signals corresponding to the area farther ahead of the vehicle.

28. The attachment of claim 27 wherein said new signal is a proximity signal which provides an indication of a persistent obstruction in advance of the vehicle.

References Cited in the file of this patent

UNITED STATES PATENTS

| | | |
|---|---|---|
| 2,331,144 | Sitter | Oct. 5, 1943 |
| 2,841,782 | McIlwain | July 1, 1958 |
| 2,996,137 | Yaohan Chu et al. | Aug. 15, 1961 |
| 3,101,175 | Brown | Aug. 20, 1963 |